United States Patent
Onomura et al.

(10) Patent No.: US 10,551,475 B2
(45) Date of Patent: Feb. 4, 2020

(54) METHOD OF DETECTING ABNORMALITY IN UNMANNED AIRCRAFT CONTROL SYSTEM AND ABNORMALITY DETECTOR

(71) Applicant: SUBARU CORPORATION, Tokyo (JP)

(72) Inventors: Yoichi Onomura, Tokyo (JP); Yu Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 133 days.

(21) Appl. No.: 15/638,760

(22) Filed: Jun. 30, 2017

(65) Prior Publication Data

US 2018/0074155 A1 Mar. 15, 2018

(30) Foreign Application Priority Data

Sep. 15, 2016 (JP) .................. 2016-180116

(51) Int. Cl.
| | |
|---|---|
| *G01S 5/00* | (2006.01) |
| *B64C 13/16* | (2006.01) |
| *B64C 13/20* | (2006.01) |
| *B64C 39/02* | (2006.01) |
| *B64D 43/00* | (2006.01) |

(52) U.S. Cl.
CPC ............ *G01S 5/0027* (2013.01); *B64C 13/16* (2013.01); *B64C 13/20* (2013.01); *B64C 39/024* (2013.01); *B64D 43/00* (2013.01); *G01S 5/0018* (2013.01); *B64C 2201/146* (2013.01); *B64C 2201/148* (2013.01)

(58) Field of Classification Search
CPC .............................. G01S 5/009; G01S 5/0018
See application file for complete search history.

(56) References Cited

U.S. PATENT DOCUMENTS

| | | | |
|---|---|---|---|
| 9,221,538 B2 | 12/2015 | Takahashi et al. | |
| 2003/0164794 A1* | 9/2003 | Haynes | ................ H04B 1/7172 342/353 |

(Continued)

FOREIGN PATENT DOCUMENTS

JP 5808781 B2 11/2015

*Primary Examiner* — Imran K Mustafa
(74) *Attorney, Agent, or Firm* — McDermott Will & Emery LLP

(57) ABSTRACT

A method of detecting abnormality in an unmanned aircraft control system that allows an unmanned aircraft including a first transceiver and a first directional antenna, and a ground facility including a second transceiver and a second directional antenna, to transmit and receive a signal to and from each other, the method including: calculating an inter-antenna distance from the first directional antenna to the second directional antenna; calculating respective transmission performances of the first directional antenna and the second directional antenna; calculating respective reception performances of the first directional antenna and the second directional antenna; estimating a reception level of a radio wave at each of the first transceiver and the second transceiver; and determining occurrence of abnormality in each of the first transceiver and the second transceiver when a difference between the estimated reception level and an actual reception level is equal to or greater than a predetermined value.

8 Claims, 4 Drawing Sheets

(56) References Cited

U.S. PATENT DOCUMENTS

2014/0354468 A1* 12/2014 Yanagi .................. G01S 7/4021
342/173
2016/0139603 A1* 5/2016 Bianchi ................. B64C 39/024
701/4

* cited by examiner

METHOD OF DETECTING ABNORMALITY IN UNMANNED AIRCRAFT CONTROL SYSTEM AND ABNORMALITY DETECTOR

CROSS-REFERENCE TO RELATED APPLICATIONS

The present application claims priority from Japanese Patent Application No. 2016-180116 filed on Sep. 15, 2016, the entire contents of which are hereby incorporated by reference.

BACKGROUND

The technology relates to a method of detecting abnormality in an unmanned aircraft control system and an abnormality detector which detect abnormality in an apparatus in the unmanned aircraft control system that controls a flight of an unmanned aircraft from a ground facility.

An unmanned aircraft control system has been known, which establishes a data link between an unmanned aircraft and a ground facility to control a flight of the unmanned aircraft from the ground facility, as disclosed in Japanese Patent No. 5808781, for example.

SUMMARY

An unmanned aircraft control system is requested to detect abnormality in a transceiver or a position measuring unit used, for example, for transmission and reception of signals as well as flight control. It is therefore desirable to provide a method of detecting abnormality in an unmanned aircraft control system and an abnormality detector that make it possible to suitably detect abnormality in a transceiver or a position determining apparatus in the unmanned aircraft control system.

An aspect of the technology provides a method of detecting abnormality in an unmanned aircraft control system that allows an unmanned aircraft and a ground facility to transmit and receive a signal to and from each other. The unmanned aircraft includes a first transceiver and a first directional antenna. The ground facility includes a second transceiver and a second directional antenna.

The method includes:

calculating an inter-antenna distance from the first directional antenna to the second directional antenna on a basis of a signal transmitted and received between the first transceiver and the second transceiver;

calculating a transmission performance of the first directional antenna on a basis of a transmission output of the first transceiver and a directional angle of the first directional antenna, and calculating a transmission performance of the second directional antenna on a basis of a transmission output of the second transceiver and a directional angle of the second directional antenna;

calculating a reception performance of the first directional antenna on a basis of the directional angle of the first directional antenna, and calculating a reception performance of the second directional antenna on a basis of the directional angle of the second directional antenna;

estimating a reception level of a radio wave at the first transceiver on a basis of the inter-antenna distance, the transmission performance of the second directional antenna, and the reception performance of the first directional antenna, and estimating a reception level of a radio wave at the second transceiver on a basis of the inter-antenna distance, the transmission performance of the first directional antenna, and the reception performance of the second directional antenna; and determining that abnormality occurs in the first transceiver on a condition that a difference between the reception level at the first transceiver estimated in the estimating and an actual reception level obtained from the first transceiver is equal to or greater than a predetermined value, and determining that abnormality occurs in the second transceiver on a condition that a difference between the reception level at the second transceiver estimated in the estimating and an actual reception level obtained from the second transceiver is equal to or greater than a predetermined value.

One or both of the unmanned aircraft and the ground facility may further include a meteorological information obtaining unit that obtains positional information on a rain cloud. In this case, the estimating may include estimating the reception level at the first transceiver and estimating the reception level at the second transceiver in consideration of the positional information on the rain cloud obtained by the meteorological information obtaining unit.

One or both of the unmanned aircraft and the ground facility may further include a storage that stores respective antenna patterns of the first directional antennal and the second directional antenna.

In this case, the transmission-performance-calculating may include calculating the respective transmission performances of the first directional antenna and the second directional antenna on a basis of the respective antenna patterns of the first directional antennal and the second directional antenna stored in the storage.

The reception-performance-calculating may further include calculating the respective reception performances of the first directional antenna and the second directional antenna on a basis of the respective antenna patterns of the first directional antennal and the second directional antenna stored in the storage.

In the method of detecting abnormality, the unmanned aircraft may perform the following (A1) to (A4):

(A1) calculating the transmission performance of the first directional antenna on the basis of the transmission output of the first transceiver and the directional angle of the first directional antenna in the transmission-performance-calculating;

(A2) calculating the reception performance of the first directional antenna on the basis of the directional angle of the first directional antenna in the reception-performance-calculating;

(A3) estimating the reception level of the radio wave at the first transceiver on the basis of the inter-antenna distance, the transmission performance of the second directional antenna, and the reception performance of the first directional antenna in the estimating; and (A4) determining that abnormality occurs in the first transceiver on the condition that the difference between the reception level at the first transceiver estimated in the estimating and the actual reception level obtained from the first transceiver is equal to or greater than the predetermined value in the determining.

In the method of detecting abnormality, the ground facility may perform the following (B1) to (B4):

(B1) calculating the transmission performance of the second directional antenna on the basis of the transmission output of the second transceiver and the directional angle of the second directional antenna in the transmission-performance-calculating;

(B2) calculating the reception performance of the second directional antenna on the basis of the directional angle of the second directional antenna in the reception-performance-calculating;

(B3) estimating the reception level of the radio wave at the second transceiver on the basis of the inter-antenna distance, the transmission performance of the first directional antenna, and the reception performance of the second directional antenna in the estimating; and (B4) determining that abnormality occurs in the second transceiver on the condition that the difference between the reception level at the second transceiver estimated in the estimating and the actual reception level obtained from the second transceiver is equal to or greater than the predetermined value in the determining.

An aspect of the technology provides a method of detecting abnormality in an unmanned aircraft control system that allows an unmanned aircraft and a ground facility to transmit and receive a signal to and from each other. The unmanned aircraft includes a first transceiver, a first directional antenna, and a position measuring unit. The ground facility includes a second transceiver and a second directional antenna.

The method includes:

calculating an inter-antenna distance from the first directional antenna to the second directional antenna on a basis of a signal transmitted and received between the first transceiver and the second transceiver;

estimating a position of the unmanned aircraft on a basis of a directional angle of the second directional antenna and the inter-antenna distance; and determining that abnormality occurs in the position measuring unit on a condition that a distance from the position of the unmanned aircraft estimated in the estimating to a position of the unmanned aircraft obtained from the position measuring unit is equal to or greater than a predetermined value.

An aspect of the technology provides an abnormality detector that detects abnormality in an unmanned aircraft control system that allows an unmanned aircraft and a ground facility to transmit and receive a signal to and from each other. The unmanned aircraft includes a first transceiver and a first directional antenna. The ground facility includes a second transceiver and a second directional antenna. The abnormality detector includes an inter-antenna distance calculator, a transmission performance calculator, a reception performance calculator, an estimator, and a determiner. The inter-antenna distance calculator calculates an inter-antenna distance from the first directional antenna to the second directional antenna on a basis of a signal transmitted and received between the first transceiver and the second transceiver. The transmission performance calculator calculates a transmission performance of the first directional antenna on a basis of a transmission output of the first transceiver and a directional angle of the first directional antenna. The transmission performance calculator calculates a transmission performance of the second directional antenna on a basis of a transmission output of the second transceiver and a directional angle of the second directional antenna. The reception performance calculator calculates a reception performance of the first directional antenna on a basis of the directional angle of the first directional antenna. The reception performance calculator calculates a reception performance of the second directional antenna on a basis of the directional angle of the second directional antenna. The estimator estimates a reception level of a radio wave at the first transceiver on a basis of the inter-antenna distance, the transmission performance of the second directional antenna, and the reception performance of the first directional antenna. The estimator estimates a reception level of a radio wave at the second transceiver on a basis of the inter-antenna distance, the transmission performance of the first directional antenna, and the reception performance of the second directional antenna. The determiner determines that abnormality occurs in the first transceiver on a condition that a difference between the reception level at the first transceiver estimated by the estimator and an actual reception level obtained from the first transceiver is equal to or greater than a predetermined value. The determiner determines that abnormality occurs in the second transceiver on a condition that a difference between the reception level at the second transceiver estimated by the estimator and an actual reception level obtained from the second transceiver is equal to or greater than a predetermined value.

An aspect of the technology provides an abnormality detector that detects abnormality in an unmanned aircraft control system that allows an unmanned aircraft and a ground facility to transmit and receive a signal to and from each other. The unmanned aircraft includes a first transceiver, a first directional antenna, and a position measuring unit. The ground facility includes a second transceiver and a second directional antenna. The abnormality detector includes an inter-antenna distance calculator, an estimator, and a determiner. The inter-antenna distance calculator calculates an inter-antenna distance from the first directional antenna to the second directional antenna on a basis of a signal transmitted and received between the first transceiver and the second transceiver. The estimator estimates a position of the unmanned aircraft on a basis of a directional angle of the second directional antenna and the inter-antenna distance. The determiner determines that abnormality occurs in the position measuring unit on a condition that a distance from the position of the unmanned aircraft estimated by the estimator to a position of the unmanned aircraft obtained from the position measuring unit is equal to or greater than a predetermined value.

DETAILED DESCRIPTION

Description is given below, with reference to the accompanying drawings, of some implementations of a method of detecting abnormality in an unmanned aircraft control system according to an implementation of the technology.

[Configuration of Unmanned Aircraft Control System]

Figure 1:
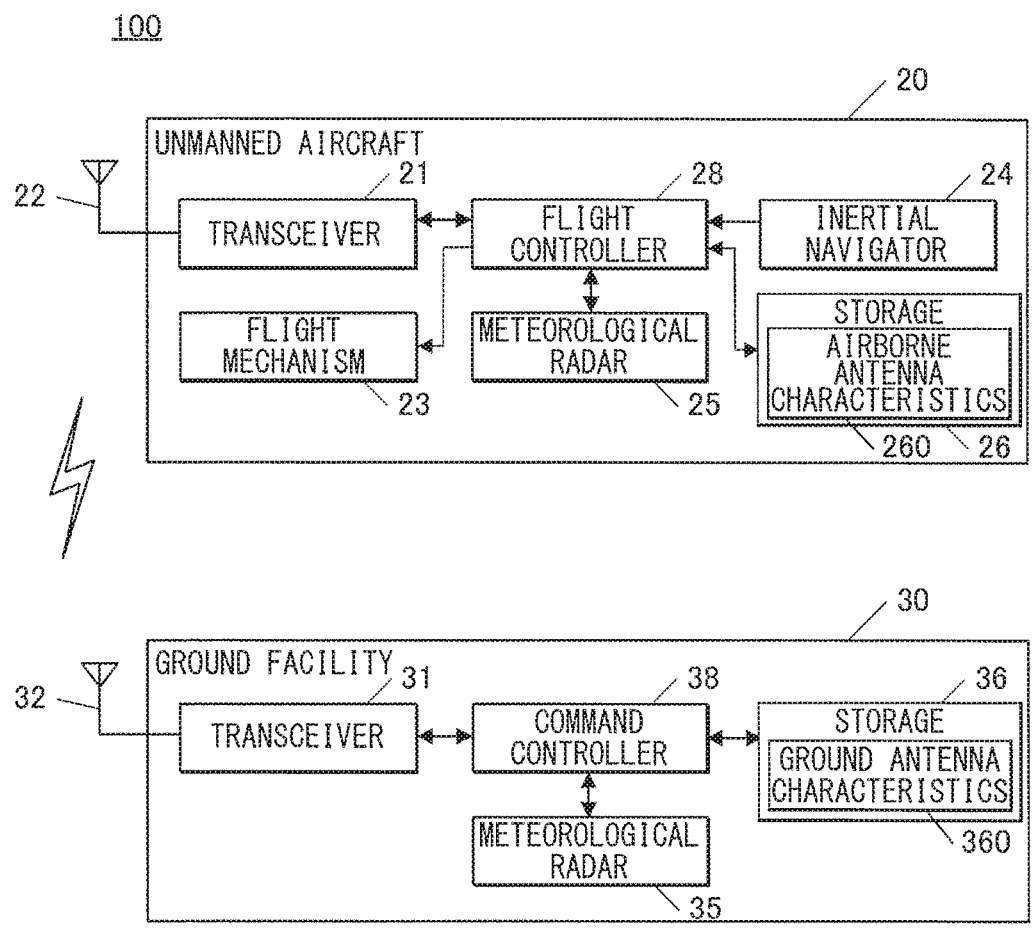
FIG. 1 is a block diagram illustrating a schematic configuration of an unmanned aircraft control system according to an implementation of the technology.

Description is given first, with reference to FIG. 1, of a configuration of an unmanned aircraft control system 100 in the implementation.

FIG. 1 is a block diagram illustrating a schematic configuration of the unmanned aircraft control system 100.

As illustrated in FIG. 1, the unmanned aircraft control system 100 may control a flight of an unmanned aircraft 20 with a control command suppled from a ground facility 30.

The unmanned aircraft 20 may be an unmanned aircraft that is able to fly autonomously on the basis of the control command supplied from the ground facility 30. The unmanned aircraft 20 may include a transceiver 21, a flight mechanism 23, an inertial navigator 24, a meteorological radar 25, a storage 26, and a flight controller 28.

The transceiver 21 may form a data link together with a transceiver 31 of the ground facility 30 described later. The transceiver 21 may transmit and receive various signals to and from the ground facility 30 via a directional antenna 22. The directional antenna 22 may change its orientation direction and to autonomously turn to a direction of the ground facility 30 within a movable range in search of a direction that allows for the strongest reception intensity of a radio wave supplied from the ground facility 30.

The flight mechanism 23 may allow the unmanned aircraft 20 to fly. The flight mechanism 23 may include components such as an internal combustion engine and an actuator for rudder face driving. The internal combustion engine may be, for example, a jet engine that generates an impelling force.

The inertial navigator 24 may allow for measurement of, for example, a position, a posture, and a speed of the unmanned aircraft 20 without depending on a radio wave supplied from the outside. In the implementation, the inertial navigator 24 may output positional information on the position of the unmanned aircraft 20 to the flight controller 28.

The meteorological radar 25 may be an airborne radar that observes meteorological circumstances. In the implementation, the meteorological radar 25 may obtain rain cloud information such as a position of a rain cloud that attenuates radio wave intensity to output a signal of the obtained rain cloud information to the flight controller 28. The position of the rain cloud may include an altitude of the rain cloud.

The storage 26 may be a memory that stores a program and data that achieves various functions of the unmanned aircraft 20 and also serves as a workspace. In the implementation, the storage 26 may store airborne antenna characteristics 260.

The airborne antenna characteristics 260 may be antenna pattern data of the directional antenna 22 mounted on the unmanned aircraft 20. In one more specific but non-limiting example, the airborne antenna characteristics 260 may be a database that plots a relationship between a transmitted/received radio wave direction with respect to the directional antenna 22 and transmitted radio wave intensity as well as a relationship between the transmitted/received radio wave direction with respect to the directional antenna 22 and reception sensitivity.

The flight controller 28 may centrally control each unit of the unmanned aircraft 20. In one more specific but non-limiting example, the flight controller 28 may control driving of the flight mechanism 23 to control the flight of the unmanned aircraft 20; transmit and receive various signals to and from the ground facility 30 through the transceiver 21 and the directional antenna 22; and develop the program stored in the storage 26 to execute various processings in cooperation with the developed program.

In contrast, the ground facility 30 may include the transceiver 31, a meteorological radar 35, a storage 36, and a command controller 38.

The transceiver 31 may form the data link together with the transceiver 21 of the unmanned aircraft 20. The transceiver 31 may transmit and receive various signals to and from the unmanned aircraft 20 via a directional antenna 32. The directional antenna 32 may be substantially omnidirectional and may autonomously turn to a direction of the unmanned aircraft 20 in search of a direction that allows for the strongest reception intensity of a radio wave supplied from the unmanned aircraft 20.

The meteorological radar 35 may be a radar that observes meteorological circumstances. In the implementation, the meteorological radar 35 may obtain information concerning the position of a rain cloud that attenuates radio wave intensity to output a signal of the obtained information to the command controller 38. The position of the rain cloud may include the altitude of the rain cloud.

The storage 36 may be a memory that stores a program and data that achieves various functions of the ground facility 30 and also serves as a workspace. In the implementation, the storage 36 may store ground antenna characteristics 360.

The ground antenna characteristics 360 may be antenna pattern data of the directional antenna 32 mounted on the ground facility 30. In one more specific but non-limiting example, the ground antenna characteristics 360 may be a database that plots a relationship between a transmitted/received radio wave direction with respect to the directional antenna 32 and transmitted radio wave intensity as well as a relationship between the transmitted/received radio wave direction with respect to the directional antenna 32 and reception sensitivity.

The command controller 38 may centrally control each unit of the ground facility 30 on the basis of a user's operation. In one more specific but non-limiting example, the command controller 38 may transmit and receive various signals to and from the unmanned aircraft 20 through the transceiver 31 and the directional antenna 32; develop a program stored in the storage 36 to execute various processings in cooperation with the developed program.

[Method of Detecting Abnormality in Transceiver]

Description is given next of a method of detecting abnormality in the transceivers 21 and 31 in the unmanned aircraft control system 100.

Figure 2:
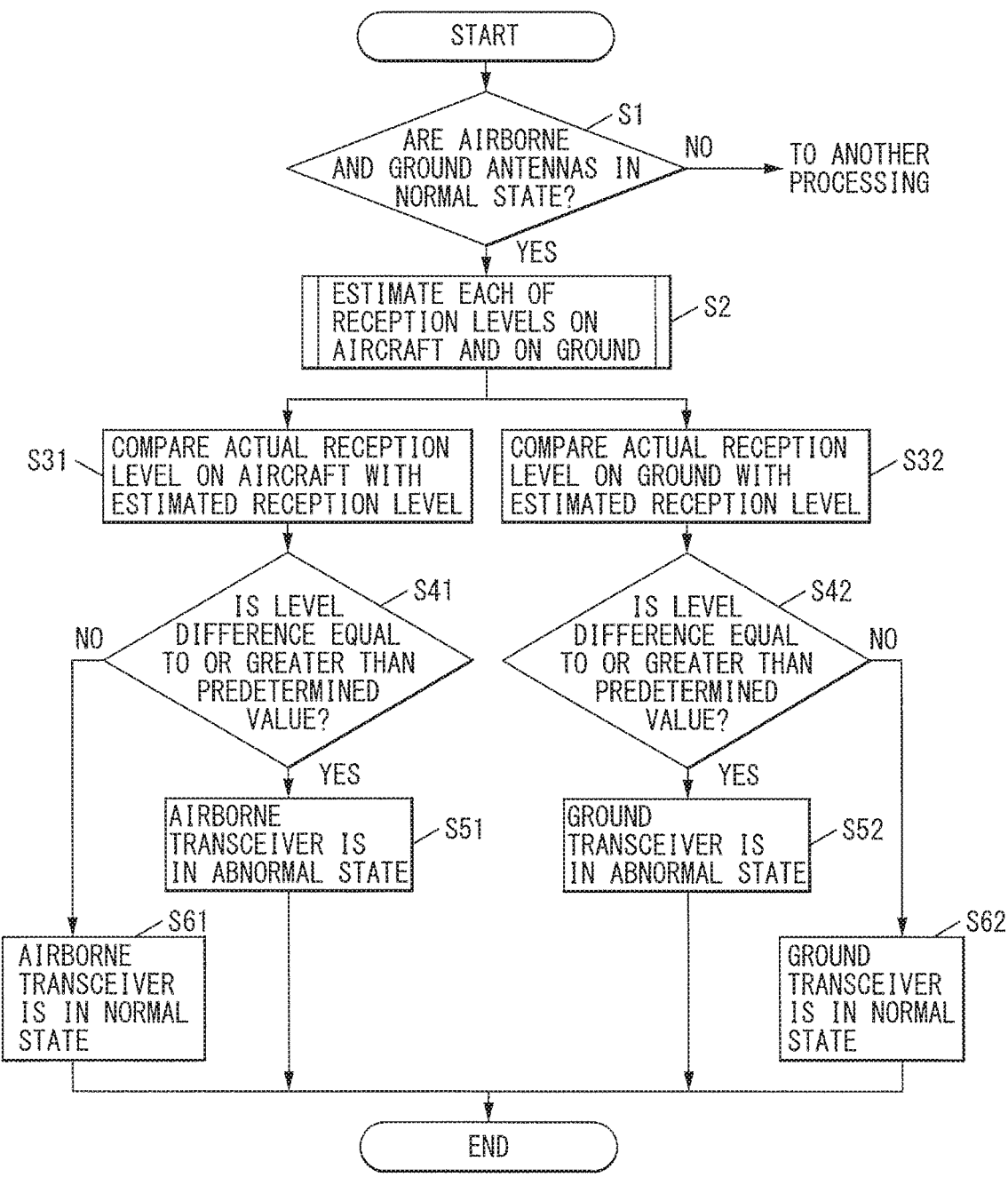
FIG. 2 is a flowchart illustrating a flow of a method of detecting abnormality in a transceiver according to an implementation of the technology.
Figure 3:
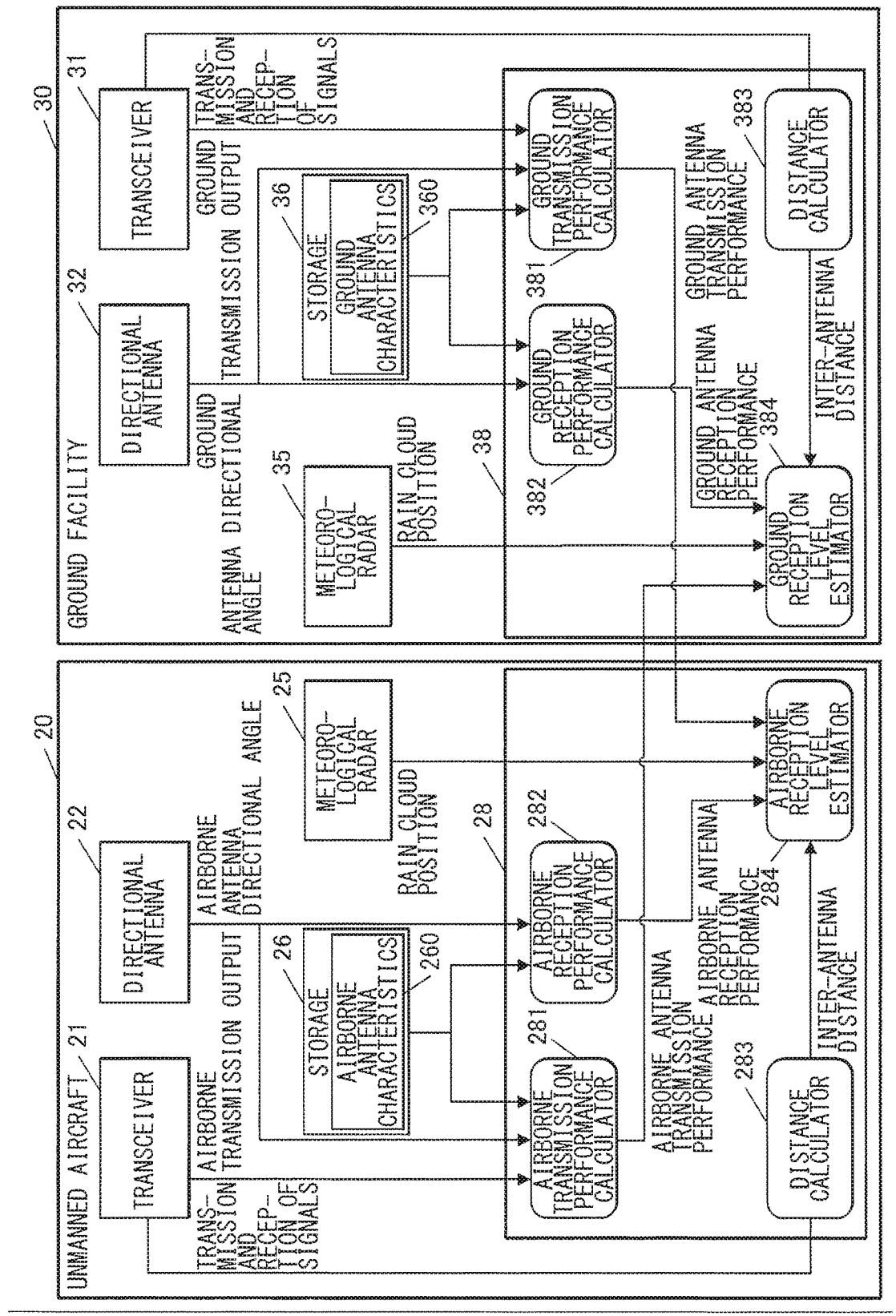
FIG. 3 is a data flowchart illustrating flows of data in estimating a reception level of the transceiver, among the processes of the method of detecting abnormality in the transceiver according to the implementation of the technology.

FIG. 2 is a flowchart illustrating a flow of the method of detecting abnormality, and FIG. 3 is a data flowchart illustrating flows of data in estimating a reception level of a radio wave, among processes of the method of detecting abnormality.

The method of detecting abnormality in the transceivers 21 and 31 in the implementation may be a processing that detects occurrence of abnormality, or failure, in the transceivers 21 and 31, for example, when one or both of the transceiver 21 of the unmanned aircraft 20 and the transceiver 31 of the ground facility 30 have a decreased reception level (although the data link is not broken).

Here, assumption is taken that the unmanned aircraft 20 is in flight. In the following description, the term "airborne" is added to the beginning of the first word of each component of the unmanned aircraft 20, whereas the term "ground" is added to the beginning of the first word of each component of the ground facility 30, for easy understanding of the description.

According to the method of detecting abnormality in the transceivers 21 and 31 in the implementation, first, it may be determined whether the airborne directional antenna 22 and the ground directional antenna 32 are both in a normal state (step S1), as illustrated in FIG. 2. In one more specific but non-limiting example, the flight controller 28 of the unmanned aircraft 20 may determine whether the airborne directional antenna 22 operates and functions normally, whereas the command controller 38 of the ground facility 30 may determine whether the around directional antenna 32 operates and functions normally.

When it is determined that even one of the airborne directional antenna 22 and the ground directional antenna 32 fails to operate and function normally (step S1; No), the flow may move to another processing.

When it is determined that the airborne directional antenna 22 and the ground directional antenna 32 are both in the normal state (step S1; Yes), a reception level of a radio wave on the unmanned aircraft 20 and a reception level of a radio wave in the ground facility 30 may be estimated (step S2).

In this step, the reception levels of the radio waves in a case where the transceivers 21 and 31 are in the normal state may be estimated, respectively, for the unmanned aircraft 20 and the ground facility 30, as illustrated in FIG. 3.

In one more specific but non-limiting example, first, in the unmanned aircraft 20, the flight controller 28 may calculate a transmission performance, i.e., transmitted radio wave intensity and a reception performance, i.e., reception sensitivity of the airborne directional antenna 22 in the orientation direction. In one more specific but non-limiting example, an airborne transmission performance calculator 281 of the flight controller 28 may calculate the transmission performance of the airborne directional antenna 22 in the orientation direction on the basis of a transmission output obtained from the airborne transceiver 21, an antenna directional angle obtained from the airborne directional antenna 22, and the airborne antenna characteristics 260 read from the storage 26. The flight controller 28 may transmit the calculated transmission performance of the airborne directional antenna 22 to the ground facility 30 via the data link. Although the wording "transmission performance of the directional antenna" is used here for convenience purpose, it goes without saying that such a transmission performance is also taken into consideration in signal output of the transceiver.

Further, an airborne reception performance calculator 282 of the flight controller 28 may calculate a reception performance of the airborne directional antenna 22 in the orientation direction, on the basis of the antenna directional angle obtained from the airborne directional antenna 22 and the airborne antenna characteristics 260 read from the storage 26.

Furthermore, a distance calculator 283 of the flight controller 28 may calculate an inter-antenna distance from the airborne directional antenna 22 to the ground directional antenna 32, i.e., a distance from the unmanned aircraft 20 to the ground facility 30 on the basis of signals transmitted and received by the airborne transceiver 21. In one more specific but non-limiting example, the distance calculator 283 may calculate the inter-antenna distance, on the basis of, for example, a signal that is attached with time information and is received by the airborne transceiver 21 from the ground facility 30, using a time difference (between reception time and transmission time included in the signal). Alternatively, the distance calculator 283 may allow the airborne transceiver 21 to send a pulse signal to the ground facility 30 for a return of the pulse signal from the ground facility 30, to calculate the inter-antenna distance on the basis of time it takes to transmit and receive the pulse signal.

In contrast, in the ground facility 30, similarly to the corresponding counterpart in the unmanned aircraft 20, the command controller 38 may calculate a transmission performance and a reception performance of the ground directional antenna 32 in the orientation direction. In one more specific but non-limiting example, a ground transmission performance calculator 381 of the command controller 38 may calculate the transmission performance of the ground directional antenna 32, on the basis of a transmission output obtained from the ground transceiver 31, an antenna directional angle obtained from the ground directional antenna 32, and the ground antenna characteristics 360 read from the storage 36. The command controller 38 may transmit the calculated transmission performance of the ground directional antenna 32 to the unmanned aircraft 20 via the data link.

Further, a ground reception performance calculator 382 of the command controller 38 may calculate the reception performance of the ground directional antenna 32, on the basis of the antenna directional angle obtained from the ground directional antenna 32 and the ground antenna characteristics 360 read from the storage 36.

Furthermore, a distance calculator 383 of the command controller 38 may calculate the inter-antenna distance from the airborne directional antenna 22 to the ground directional antenna 32, i.e., the distance from the unmanned aircraft 20 to the ground facility 30 on the basis of signals transmitted and received by the transceiver 31. In one more specific but non-limiting example, the distance calculator 383 may calculate the inter-antenna distance, on the basis of, for example, a signal that is attached with time information and is received by the ground transceiver 31 from the unmanned aircraft 20, using a time difference (between reception time and transmission time included in the signal). Alternatively, the distance calculator 383 may allow the ground transceiver 31 to send a pulse signal to the unmanned aircraft 20 for a return of the pulse signal from the unmanned aircraft 20, to calculate the inter-antenna distance on the basis of time it takes to transmit and receive the pulse signal.

In the unmanned aircraft 20, an airborne reception level estimator 284 of the flight controller 28 may estimate a reception level of a radio wave in the unmanned aircraft 20 that would be obtained if the transceivers 21 and 31 were in the normal state on the basis of several factors. The several factors may include the transmission performance of the ground directional antenna 32 transmitted from the ground facility 30, the reception performance of the airborne directional antenna 22 calculated by the airborne reception performance calculator 282, the inter-antenna distance calculated by the distance calculator 283, and the rain cloud information obtained from the meteorological radar 25. Here, the rain cloud information may be used to consider, for example, at what degree of moisture and across what distance a rain cloud, which is an attenuation factor of a radio wave, lies between the unmanned aircraft 20 and the ground facility 30.

Likewise, in the ground facility 30, a ground reception level estimator 384 of the command controller 38 may estimate a reception level of a radio wave in the ground facility 30 that would be obtained if the transceivers 21 and 31 were in the normal state on the basis of several factors. The several factors may include the transmission performance of the airborne directional antenna 22 transmitted from the unmanned aircraft 20, the reception performance of the ground directional antenna 32 calculated by the ground reception performance calculator 382, the inter-antenna distance calculated by the distance calculator 383, and the rain cloud information obtained from the meteorological radar 35.

When each of the reception levels on the aircraft and on the ground is estimated, it may be determined whether there is any abnormality in the transceivers 21 and 31 separately for the unmanned aircraft 20 and the ground facility 30, as illustrated in FIG. 2.

In one more specific but non-limiting example, the unmanned aircraft 20 may first obtain an actual reception level from the airborne transceiver 21 to compare the obtained actual reception level with the estimated reception level (step S31).

Thereafter, the flight controller 28 may determine whether a level difference between the actual reception level and the estimated reception level is equal to or greater than a predetermined value, i.e., whether the actual reception level and the estimated reception level are regarded as substantially equal to each other (step S41).

When the flight controller 28 determines that the level difference between the actual reception and the estimated reception level is equal to or greater than the predetermined value (step S41; Yes), the flight controller 28 may determine that abnormality occurs in the airborne transceiver 21, and may transmit a signal to that effect to the ground facility 30 (step S51).

When the flight controller 28 determines that the level difference between the actual reception level and the estimated reception level is smaller than the predetermined value (step S41; No), the flight controller 28 may determine that the airborne transceiver 21 is in the normal state, and may transmit a signal to that effect to the ground facility 30 (step S61).

In contrast, in the ground facility 30, the command controller 38 may obtain an actual reception level from the ground transceiver 31 to compare the obtained actual reception level with the estimated reception level (step S32).

Thereafter, the command controller 38 may determine whether a level difference between the actual reception level and the estimated reception level is equal to or greater than a predetermined value, i.e., whether the actual reception level and the estimated reception level are regarded as substantially equal to each other (step S42).

When the command controller 38 determines that the level difference between the actual reception level and the estimated reception level is equal to or greater than the predetermined value (step S42; Yes), the command controller 38 may determine that abnormality occurs in the ground transceiver 31 (step S52).

When the command controller 38 determines that the level difference between the actual reception level and the estimated reception level is smaller than the predetermined value (step S42; No), the command controller 38 may determine that the ground transceiver 31 is in the normal state (step S62).

When it is thus determined that one or both of the airborne transceiver 21 and the ground transceiver 31 are in an abnormal state as a result of the determination as to whether there is any abnormality in the airborne transceiver 21 and the ground transceiver 31, an emergency measure may be taken, such as discontinuation of a flight mission of the unmanned aircraft 20. Further, when it is determined that both of the transceivers are in the normal state, it may be judged that the reception level is decreased due to a surrounding environment, and the flight mission of the unmanned aircraft 20 may be continued through a measure such as flight path change. Non-limiting examples of the surrounding environment may include a rain cloud and a far distance from the unmanned aircraft 20 to the ground facility 30.

[Method of Detecting Abnormality in Inertial Navigator]

Description is given next of a method of detecting abnormality in the inertial navigator 24 in the unmanned aircraft control system 100.

Figure 4:
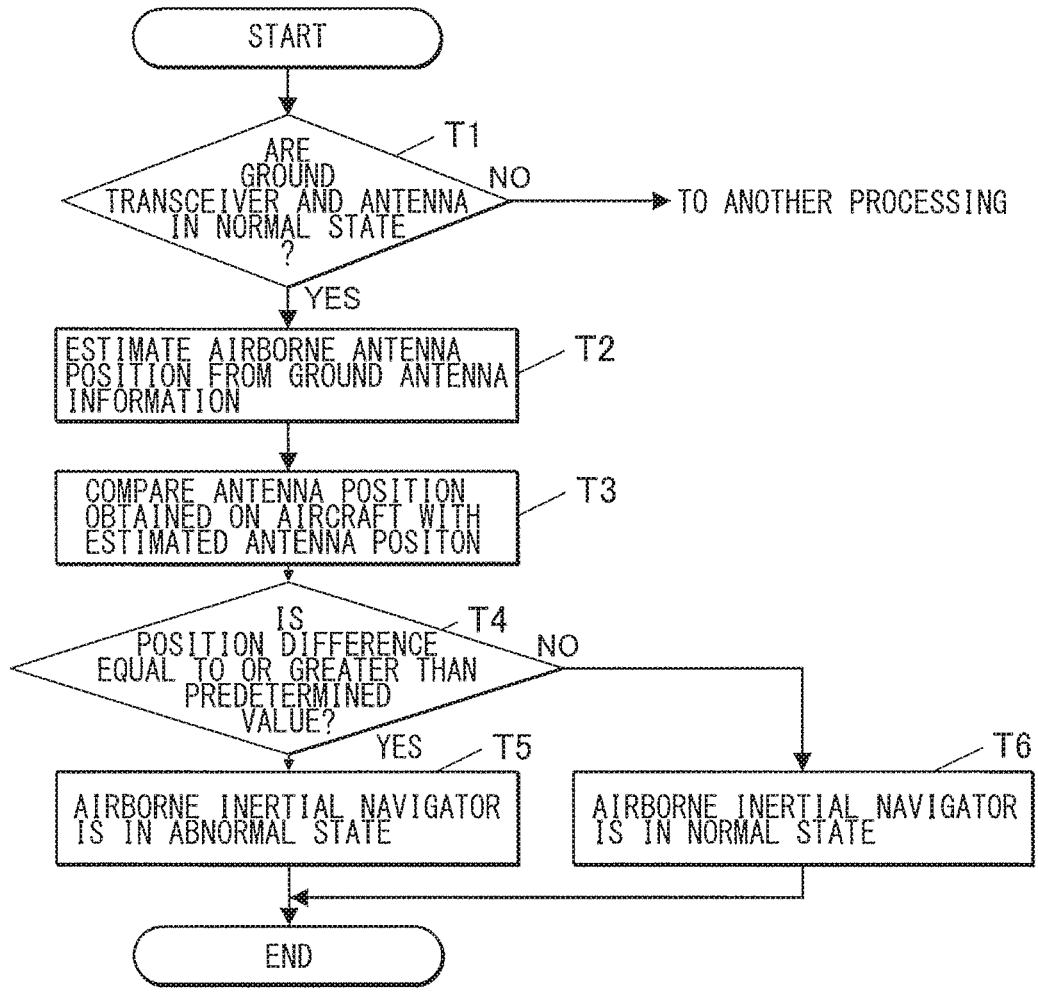
FIG. 4 is a flowchart illustrating a flow of a method of detecting abnormality in an inertial navigator according to an implementation of the technology.

FIG. 4 is a flowchart illustrating a flow of the method of detecting abnormality.

The method of detecting abnormality in the inertial navigator 24 in the implementation may be, for example, a processing that detects occurrence of abnormality, or failure, in the inertial navigator 24, in a case suspected of, for example, defective position measurement of the unmanned aircraft 20, such as global positioning system (GPS) information deception, in which various types of information are deceived with false GPS signals. The inertial navigator 24 calculates the position of the unmanned aircraft 20.

Assumption is taken here that the unmanned aircraft 20 is in flight.

In the method of detecting abnormality in the inertial navigator 24 in the implementation, the command controller 38 of the ground facility 30 may first determine whether the ground transceiver 31 and the ground directional antenna 32 both operate and function normally, as illustrated in FIG. 4 (step T1).

When it is determined that even one of the ground transceiver 31 and the ground directional antenna 32 fails to operate and function normally (step T1; No), the flow may move to another processing.

When it is determined that ground transceiver 31 and the ground directional antenna 32 are both in the normal state (step T1; Yes), the position of the airborne directional antenna 22, i.e., the position of the unmanned aircraft 20 may be estimated on the basis of antenna information in the ground facility 30 (step T2).

In one more specific but non-limiting example, the command controller 38 of the ground facility 30 may estimate the position of the airborne directional antenna 22 on the basis of the antenna directional angle, i.e., a radio wave tracking direction obtained from the around directional antenna 32 and the inter-antenna distance obtained from the ground transceiver 31. In other words, the position of the airborne directional antenna 22 may be estimated such that the airborne directional antenna 22, i.e., the unmanned aircraft 20 is located at a position distant by the inter-antenna distance in the orientation direction of the ground directional antenna 32. Here, the inter-antenna distance may be calculated on the basis of the signals transmitted and received by the ground transceiver 31, as with the above-described case of detecting abnormality in the transceiver.

Further, the command controller 38 may transmit the estimated position of the airborne directional antenna 22 to the unmanned aircraft 20 via the data link.

Thereafter, the flight controller 28 of the unmanned aircraft 20 may obtain the positional information on the position of the unmanned aircraft 20, i.e., the position of the airborne directional antenna 22 from the inertial navigator 24 to compare the obtained information on the position of the unmanned aircraft 20 with the estimated position transmitted from the ground facility 30 (step T3).

Thereafter, the flight controller 28 may determine whether a difference, or a distance between the position of the unmanned aircraft 20 obtained from the inertial navigator 24 and the estimated position of the unmanned aircraft 20 is equal to or greater than a predetermined value, i.e., whether these positions are regarded as being substantially coincident with each other (step T4).

When the flight controller 28 determines that the difference between these positions is equal to or greater than the predetermined value (step T4; Yes), the flight controller 28 may determine that abnormality occurs in the inertial navigator 24, and may transmit a signal to that effect to the ground facility 30 (step T5).

When the flight controller 28 determines that the difference between these positions is smaller than the predetermined value (step T4; No), the flight controller 28 may determine that the inertial navigator 24 is in the normal state (step T6).

When it is thus determined that there is abnormality as a result of the determination as to whether there is any abnormality in the inertial navigator 24 on the unmanned aircraft 20, the emergency measure may be taken as necessary, such as the discontinuation of the flight mission of the unmanned aircraft 20.

The unmanned aircraft control system has been known, which establishes the data link between the unmanned aircraft and the ground facility to control the flight of the unmanned aircraft from the ground facility, as disclosed in Japanese Patent No. 5808781, for example. It is important for such an unmanned aircraft control system to have sound operability of various apparatuses used for transmission and reception of signals as well as for flight control, for example. In some cases, however, the apparatus alone may not be able to detect abnormality in itself due to factors such as an influence of the surrounding environment.

For example, when a transceiver, which transmits and receives signals, has a decreased reception level of a signal, i.e., a radio wave, it is difficult for the transceiver alone to determine whether the decreased reception level is caused by the surrounding environment or by failure of the transceiver itself. Non-limiting examples of the surrounding environment may include the rainfall and the far distance from the unmanned aircraft to the ground facility.

Further, it is important for the flight control of the unmanned aircraft to have quality in measuring a flight position. However, it is difficult for the inertial navigator or a position-posture measuring unit alone on the aircraft to detect the defective position measurement such as the UPS information deception.

[Effects]

As described above, according to the implementation, the reception level of one of the transceivers that would be obtained if both of the transceivers were in the normal state is estimated on the basis of several factors. The several factors may include the inter-antenna distance between the unmanned aircraft 20 and the ground facility 30, the reception performance of the directional antenna in the relevant one of the unmanned aircraft 20 and the ground facility 30, and the transmission performance of the directional antenna in the other of the unmanned aircraft 20 and the ground facility 30. When the difference between the estimated reception level and the actual reception level obtained from the relevant one of the transceivers is equal to or greater than the predetermined value, it is determined that abnormality occurs in the relevant one of the transceivers.

This makes it possible to detect abnormality in the transceivers 21 and 31, even when the transceivers 21 and 31 are not able to detect its own abnormality for themselves, by utilizing information from the apparatus (one of the unmanned aircraft 20 and the ground facility 30) separate from the apparatus (the other of the unmanned aircraft 20 and the ground facility 30) which includes the relevant one of the transceivers 21 and 31.

Thus, it becomes possible, in the unmanned aircraft control system 100, to suitably detect abnormality in the transceivers 21 and 31 that transmit and receive signals to and from each other. This enables suitable determination as to whether the decrease in the reception level is caused by the abnormality in the transceivers 21 and 31 or by the surrounding environment, thus making it possible to reduce the possibility of discontinuing the mission, as compared to a system where the mission is discontinued every time the reception level decreases.

Further, the inter-antenna distance is calculated on the basis of the signals transmitted and received by the transceiver 31 of the ground facility 30, and the position of the unmanned aircraft 20 is estimated on the basis of the inter-antenna distance and the directional angle of the directional antenna 32 of the ground facility 30. When the distance between the estimated position of the unmanned aircraft 20 and the position of the unmanned aircraft 20 obtained from the inertial navigator 24 on the unmanned aircraft 20 is equal to or greater than the predetermined value, it is determined that abnormality occurs in the inertial navigator 24.

This makes it possible to detect abnormality in the inertial navigator 24, even when the inertial navigator 24 on the unmanned aircraft 20 is not able to detect abnormality for itself, by utilizing information from the ground facility 30.

Accordingly, it becomes possible, in the unmanned aircraft control system 100, to suitably detect abnormality (i.e., the defective position measurement such as the GPS information deception) in the inertial navigator 24 that measures the position of the unmanned aircraft 20.

[Modifications]

It is to be noted that the technology is not limitedly applicable to the foregoing implementations. It should be appreciated that modifications and alterations may be made by persons skilled in the art without departing from the scope as defined by the appended claims.

For example, in the implementation, the meteorological radar provided for each of the unmanned aircraft 20 and the around facility 30 obtains the rain cloud information; however, there is no particular limitation on specific configurations of the unmanned aircraft 20 and the ground facility 30 insofar as the unmanned aircraft 20 and the around facility 30 are able to obtain the meteorological information including the rain cloud information. For example, the meteorological information may also be obtained through a communication network using a communication unit. In another alternative, one of the unmanned aircraft 20 and the ground facility 30 may obtain the meteorological information using the meteorological radar or the communication unit to transmit the meteorological information to the other of the unmanned aircraft 20 and the ground facility 30 via the data link. For example, the meteorological radar 35 may be provided only for the around facility 30.

Further, according to the method of detecting abnormality in transceivers in the foregoing implementation, the controllers (i.e., the flight controller 28 and the command controller 38) of the unmanned aircraft 20 and the ground facility 30 execute corresponding processes for the respective transceivers of the unmanned aircraft 20 and the ground facility 30 that include the respective controllers; however, either of the controllers may execute the corresponding processes of both the transceivers.

For example, the command controller 38 of the ground facility 30 may obtain, from the unmanned aircraft 20, the airborne antenna directional angle and the airborne transmission output to perform operations such as the calculation of the airborne transmission and reception performances and the estimation of the reception level. In this case, however, in one preferable but non-limiting example, the airborne antenna characteristics 260 may be stored beforehand in the storage 36 of the ground facility 30, and the storage 36 of the ground facility 30 may be used instead of the storage 26 of the unmanned aircraft 20. In one preferable but non-limiting example, the command controller 38 of the ground facility 30 may perform arithmetic processing as much as possible, because the command controller 38 of the ground facility 30 is expected to have higher arithmetic processing performance than the flight controller 28 of the unmanned aircraft 20.

Moreover, also in the method of detecting abnormality in the inertial navigator, either of the controllers (i.e., flight controller 28 and command controller 38) of unmanned aircraft 20 and the ground facility 30 may execute substantially all the processes.

For example, the command controller 38 of the ground facility 30 may obtain, from the unmanned aircraft 20, the positional information supplied by the inertial navigator 24, and may perform operations such as the comparison using the obtained positional information.

The invention claimed is:

1. A method of detecting abnormality in an unmanned aircraft control system that allows an unmanned aircraft and a ground facility to transmit and receive a signal to and from each other, the unmanned aircraft including a first transceiver and a first directional antenna, the ground facility including a second transceiver and a second directional antenna, the method comprising:
calculating an inter-antenna distance from the first directional antenna to the second directional antenna on a basis of a signal transmitted and received between the first transceiver and the second transceiver;
calculating a transmission performance of the first directional antenna on a basis of a transmission output of the first transceiver and a directional angle of the first directional antenna, and calculating a transmission performance of the second directional antenna on a basis of a transmission output of the second transceiver and a directional angle of the second directional antenna;
calculating a reception performance of the first directional antenna on a basis of the directional angle of the first directional antenna, and calculating a reception performance of the second directional antenna on a basis of the directional angle of the second directional antenna;
estimating a reception level of a radio wave at the first transceiver on a basis of the inter-antenna distance, the transmission performance of the second directional antenna, and the reception performance of the first directional antenna, and estimating a reception level of a radio wave at the second transceiver on a basis of the inter-antenna distance, the transmission performance of the first directional antenna, and the reception performance of the second directional antenna; and
determining that abnormality occurs in the first transceiver on a condition that a difference between the reception level at the first transceiver estimated in the estimating and an actual reception level obtained from the first transceiver is equal to or greater than a predetermined value, and determining that abnormality occurs in the second transceiver on a condition that a difference between the reception level at the second transceiver estimated in the estimating and an actual reception level obtained from the second transceiver is equal to or greater than a predetermined value.

2. The method of detecting abnormality in the unmanned aircraft control system according to claim 1, wherein
one or both of the unmanned aircraft and the ground facility further include a meteorological information obtaining unit that obtains positional information on a rain cloud, and
the estimating includes estimating the reception level at the first transceiver and estimating the reception level at the second transceiver in consideration of the positional information on the rain cloud obtained by the meteorological information obtaining unit.

3. The method of detecting abnormality in the unmanned aircraft control system according to claim 1, wherein
one or both of the unmanned aircraft and the ground facility further include a storage that stores respective antenna patterns of the first directional antennal and the second directional antenna, and
the transmission-performance-calculating includes calculating the respective transmission performances of the first directional antenna and the second directional antenna on a basis of the respective antenna patterns of the first directional antennal and the second directional antenna stored in the storage, and
the reception-performance-calculating includes calculating the respective reception performances of the first directional antenna and the second directional antenna on a basis of the respective antenna patterns of the first directional antennal and the second directional antenna stored in the storage.

4. The method of detecting abnormality in the unmanned aircraft control system according to claim 2, wherein
one or both of the unmanned aircraft and the ground facility further include a storage that stores respective antenna patterns of the first directional antennal and the second directional antenna, and
the transmission-performance-calculating includes calculating the respective transmission performances of the first directional antenna and the second directional antenna on a basis of the respective antenna patterns of the first directional antennal and the second directional antenna stored in the storage, and
the reception-performance-calculating includes calculating the respective reception performances of the first directional antenna and the second directional antenna on a basis of the respective antenna patterns of the first directional antennal and the second directional antenna stored in the storage.

5. The method of detecting abnormality in the unmanned aircraft control system according to claim 1, wherein
the unmanned aircraft calculates the transmission performance of the first directional antenna on the basis of the transmission output of the first transceiver and the directional angle of the first directional antenna in the transmission-performance-calculating,
the unmanned aircraft calculates the reception performance of the first directional antenna on the basis of the directional angle of the first directional antenna in the reception-performance-calculating,
the unmanned aircraft estimates the reception level of the radio wave at the first transceiver on the basis of the inter-antenna distance, the transmission performance of the second directional antenna, and the reception performance of the first directional antenna in the estimating,
the unmanned aircraft determines that abnormality occurs in the first transceiver on the condition that the difference between the reception level at the first transceiver estimated in the estimating and the actual reception level obtained from the first transceiver is equal to or greater than the predetermined value in the determining, the ground facility calculates the transmission performance of the second directional antenna on the basis of the transmission output of the second transceiver and the directional angle of the second directional antenna in the transmission-performance-calculating, the ground facility calculates the reception performance of the second directional antenna on the basis of the directional angle of the second directional antenna in the reception-performance-calculating, the ground facility estimates the reception level of the radio wave at the second transceiver on the basis of the inter-antenna distance, the transmission performance of the first directional antenna, and the reception performance of the second directional antenna in the estimating, and the ground facility determines that abnormality occurs in the second transceiver on the condition that the difference between the reception level at the second transceiver estimated in the estimating and the actual reception level obtained from the second transceiver is equal to or greater than the predetermined value in the determining.

6. The method of detecting abnormality in the unmanned aircraft control system according to claim 2, wherein the unmanned aircraft calculates the transmission performance of the first directional antenna on the basis of the transmission output of the first transceiver and the directional angle of the first directional antenna in the transmission-performance-calculating, the unmanned aircraft calculates the reception performance of the first directional antenna on the basis of the directional angle of the first directional antenna in the reception-performance-calculating, the unmanned aircraft estimates the reception level of the radio wave at the first transceiver on the basis of the inter-antenna distance, the transmission performance of the second directional antenna, and the reception performance of the first directional antenna in the estimating, the unmanned aircraft determines that abnormality occurs in the first transceiver on the condition that the difference between the reception level at the first transceiver estimated in the estimating and the actual reception level obtained from the first transceiver is equal to or greater than the predetermined value in the determining, the ground facility calculates the transmission performance of the second directional antenna on the basis of the transmission output of the second transceiver and the directional angle of the second directional antenna in the transmission-performance-calculating, the ground facility calculates the reception performance of the second directional antenna on the basis of the directional angle of the second directional antenna in the reception-performance-calculating, the ground facility estimates the reception level of the radio wave at the second transceiver on the basis of the inter-antenna distance, the transmission performance of the first directional antenna, and the reception performance of the second directional antenna in the estimating, and the ground facility determines that abnormality occurs in the second transceiver on the condition that the difference between the reception level at the second transceiver estimated in the estimating and the actual reception level obtained from the second transceiver is equal to or greater than the predetermined value in the determining.

7. The method of detecting abnormality in the unmanned aircraft control system according to claim 3, wherein the unmanned aircraft calculates the transmission performance of the first directional antenna on the basis of the transmission output of the first transceiver and the directional angle of the first directional antenna in the transmission-performance-calculating, the unmanned aircraft calculates the reception performance of the first directional antenna on the basis of the directional angle of the first directional antenna in the reception-performance-calculating, the unmanned aircraft estimates the reception level of the radio wave at the first transceiver on the basis of the inter-antenna distance, the transmission performance of the second directional antenna, and the reception performance of the first directional antenna in the estimating, the unmanned aircraft determines that abnormality occurs in the first transceiver on the condition that the difference between the reception level at the first transceiver estimated in the estimating and the actual reception level obtained from the first transceiver is equal to or greater than the predetermined value in the determining, the ground facility calculates the transmission performance of the second directional antenna on the basis of the transmission output of the second transceiver and the directional angle of the second directional antenna in the transmission-performance-calculating, the ground facility calculates the reception performance of the second directional antenna on the basis of the directional angle of the second directional antenna in the reception-performance-calculating, the ground facility estimates the reception level of the radio wave at the second transceiver on the basis of the inter-antenna distance, the transmission performance of the first directional antenna, and the reception performance of the second directional antenna in the estimating, and the ground facility determines that abnormality occurs in the second transceiver on the condition that the difference between the reception level at the second transceiver estimated in the estimating and the actual reception level obtained from the second transceiver is equal to or greater than the predetermined value in the determining.

8. The method of detecting abnormality in the unmanned aircraft control system according to claim 4, wherein the unmanned aircraft calculates the transmission performance of the first directional antenna on the basis of the transmission output of the first transceiver and the directional angle of the first directional antenna in the transmission-performance-calculating, the unmanned aircraft calculates the reception performance of the first directional antenna on the basis of the directional angle of the first directional antenna in the reception-performance-calculating, the unmanned aircraft estimates the reception level of the radio wave at the first transceiver on the basis of the inter-antenna distance, the transmission performance of the second directional antenna, and the reception performance of the first directional antenna in the estimating, the unmanned aircraft determines that abnormality occurs in the first transceiver on the condition that the difference between the reception level at the first transceiver estimated in the estimating and the actual reception level obtained from the first transceiver is equal to or greater than the predetermined value in the determining, the ground facility calculates the transmission performance of the second directional antenna on the basis of the transmission output of the second transceiver and the directional angle of the second directional antenna in the transmission-performance-calculating, the ground facility calculates the reception performance of the second directional antenna on the basis of the directional angle of the second directional antenna in the reception-performance-calculating, the ground facility estimates the reception level of the radio wave at the second transceiver on the basis of the inter-antenna distance, the transmission performance of the first directional antenna, and the reception performance of the second directional antenna in the estimating, and the ground facility determines that abnormality occurs in the second transceiver on the condition that the difference between the reception level at the second transceiver estimated in the estimating and the actual reception level obtained from the second transceiver is equal to or greater than the predetermined value in the determining.

* * * * *